United States Patent
Wada

(10) Patent No.: US 10,878,672 B2
(45) Date of Patent: Dec. 29, 2020

(54) NUMERICAL CONTROLLER

(71) Applicant: Fanuc Corporation, Yamanashi (JP)

(72) Inventor: Kyouhei Wada, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/292,851

(22) Filed: Mar. 5, 2019

(65) Prior Publication Data

US 2019/0287356 A1    Sep. 19, 2019

(30) Foreign Application Priority Data

Mar. 13, 2018    (JP) ................. 2018-045203

(51) Int. Cl.
*G08B 5/22*    (2006.01)
*H04Q 1/24*    (2006.01)

(52) U.S. Cl.
CPC ............... *G08B 5/22* (2013.01); *H04Q 1/24* (2013.01); *H04Q 2213/1316* (2013.01)

(58) Field of Classification Search
CPC ...... G08B 5/22; H04Q 1/24; H04Q 213/1316; G05B 19/054; G05B 2219/41112
USPC .......................................................... 340/533
See application file for complete search history.

(56) References Cited

U.S. PATENT DOCUMENTS

| | | | | |
|---|---|---|---|---|
| 3,878,445 A | * | 4/1975 | Kirkham ............... | G05B 19/237 318/799 |
| 5,105,135 A | * | 4/1992 | Nashiki ............... | B23Q 5/10 318/434 |
| 8,350,713 B2 | * | 1/2013 | Matsubara ............ | G05B 19/406 340/461 |
| 2008/0123723 A1 | * | 5/2008 | Aoyama ............ | G06F 13/4256 375/220 |
| 2008/0177403 A1 | * | 7/2008 | Masuya ............ | G05B 19/4061 700/90 |
| 2011/0063122 A1 | | 3/2011 | Matsubara et al. | |

(Continued)

FOREIGN PATENT DOCUMENTS

| | | |
|---|---|---|
| JP | 58-26590 A | 2/1983 |
| JP | 2004164605 A | 6/2004 |
| JP | 2008-135855 A | 6/2008 |

(Continued)

OTHER PUBLICATIONS

Notice of Reasons for Refusal for Japanese Application No. 2018-045203, dated Feb. 18, 2020, with translation, 6 pages.

*Primary Examiner* — Eric Blount
(74) *Attorney, Agent, or Firm* — RatnerPrestia

(57) ABSTRACT

There is provided a numerical controller that automatically acquires detailed information on a wired device prior to connection setting.

The numerical controller is connectable to a plurality of devices, and includes a connection information acquisition unit that acquires connection information on each of the devices, including information indicating a connection order and a kind of each of the devices by communicating with each of the devices in a hardware level, a connecting data creation unit that creates connecting data using the connection information, a connection processing execution unit that executes connection processing with each of the devices in a software level using the connecting data, and a detailed information acquisition unit that acquires detailed information from each of the devices subjected to the connection processing.

3 Claims, 11 Drawing Sheets

(56) References Cited

U.S. PATENT DOCUMENTS

2013/0123952 A1* 5/2013 Reid ................ G05B 19/054
  700/83
2016/0209823 A1* 7/2016 Hotta ................ G05B 19/054

FOREIGN PATENT DOCUMENTS

| JP | 2011-060076 A | 3/2011 |
| JP | 2014119907 A | 6/2014 |
| WO | 2015045004 A1 | 4/2015 |

* cited by examiner

| NAME | DETAIL |
|---|---|
| SERVO AMPLIFIER #1 | TRIAXIAL SERVO AMPLIFIER |
| SERVO AMPLIFIER #2 | UNIAXIAL SERVO AMPLIFIER |
| SPINDLE AMPLIFIER #1 | UNIAXIAL SPINDLE AMPLIFIER |

| CONNECTION ORDER | IDENTIFICATION INFORMATION |
|---|---|
| 1 | SV |
| 2 | SV |
| 3 | SV |
| 4 | SV |
| 5 | SP |

| AMPLIFIER NUMBER | MOTOR NUMBER | CORRESPONDENCE NUMBER |
|---|---|---|
| SV-AMP-0001 | SV-MOTOR-0001 | SV-0001-0001 |
| SV-AMP-0002 | SV-MOTOR-0002 | SV-0002-0002 |
| SV-AMP-0003 | SV-MOTOR-0003 | SV-0003-0003 |
| SV-AMP-0004 | SV-MOTOR-0004 | SV-0004-0004 |
| SP-AMP-0001 | SP-MOTOR-0001 | SP-0005-0001 |

NUMERICAL CONTROLLER

RELATED APPLICATIONS

The present application claims priority to Japanese Patent Application Number 2018-045203 filed Mar. 13, 2018, the disclosure of which is hereby incorporated by reference herein in its entirety.

BACKGROUND OF THE INVENTION

1. Field of the Invention

The present invention relates to a numerical controller, and more particularly to a numerical controller that automatically acquires detailed information on a wired device prior to connection setting.

2. Description of the Related Art

Conventionally, a device (e.g., a spindle amplifier SP, a servo amplifier SV, a motor, a separate detector SDU, or the like) connected to a serial bus or the like of a numerical controller CNC by a daisy chain system as illustrated in FIG. 1 is associated with a numerical controller using a preset connection setting parameter (refer to Japanese Patent Laid-Open No. 58-26590 and Japanese Patent Laid-Open No. 2008-135855).

When a numerical controller refers to detailed information (e.g., a drawing number, a current value, temperature, and the like) on a device, the numerical controller and the device need to be preliminarily associated with each other (refer to Japanese Patent Laid-Open No. 2011-060076).

According to a conventional art, the numerical controller cannot refer to the detailed information on the device for using it, until a technician correctly completes setting of a connection setting parameter.

Meanwhile, when an unskilled technician for operation of a numerical controller starts a machine tool, for example, the technician may want to use detailed information on the device to appropriately set a connection setting parameter. However, it is surely impossible to refer to the detailed information on the device until the setting of the connection setting parameter is correctly completed. This causes an unskilled technician for operation of the numerical controller to have a large burden on starting operation of the machine tool.

Thus, when the need for setting operation of a connection setting parameter in a stage before use of the detailed information on the device connected to the numerical controller can be eliminated, i.e., when a technician can refer to the detailed information on the device without acquiring the connection setting parameter, an operation burden to the technician on start of the machine tool can be reduced.

The present invention is made to solve a problem as described above, and an object thereof is to provide a numerical controller that automatically acquires detailed information on a wired device prior to connection setting.

SUMMARY OF THE INVENTION

A numerical controller according to an embodiment of the present invention is connectable to a plurality of devices, and includes a connection information acquisition unit that acquires connection information on the devices, including information indicating a connection order and a kind of each of the devices by communicating with each of the devices in a hardware level, a connecting data creation unit that creates connecting data using the connection information, a connection processing execution unit that executes connection processing with each of the devices in a software level using the connecting data, and a detailed information acquisition unit that acquires detailed information subjected to the connection processing.

A numerical controller according to the embodiment of the present invention further includes a connection information comparison unit that compares the connection information with a connection setting parameter, and the connecting data creation unit creates connecting data using the connection information when a comparison result acquired by the connection information comparison unit shows a problem between the connection information and the connection setting parameter.

A numerical controller according to the embodiment of the present invention has the connecting data including a number identifying an amplifier, a motor, a separate detector, or an input/output device.

A numerical controller according to the embodiment of the present invention includes the detailed information acquisition unit that repeats communication in the software level to acquire additional information from each of the devices.

According to the present invention, a numerical controller that automatically acquires detailed information on a wired device prior to connection setting can be provided.

BRIEF DESCRIPTION OF THE DRAWINGS

The object of the present invention described above, and other objects and features of the present invention, will be clear from descriptions on embodiments below with reference to accompanying drawings. The drawings are as follows.

DETAILED DESCRIPTION OF THE PREFERRED EMBODIMENTS

A configuration of a numerical controller 1 according to an embodiment of the present invention will be described.

Figure 1:
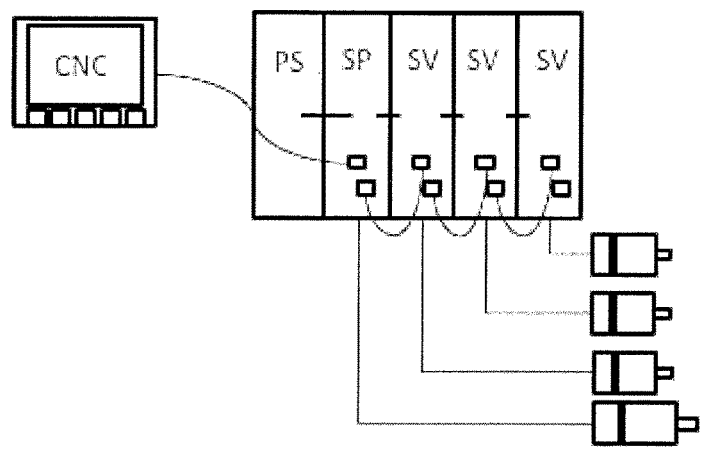
FIG. 1 illustrates a numerical controller connected to a plurality of devices.
Figure 2:
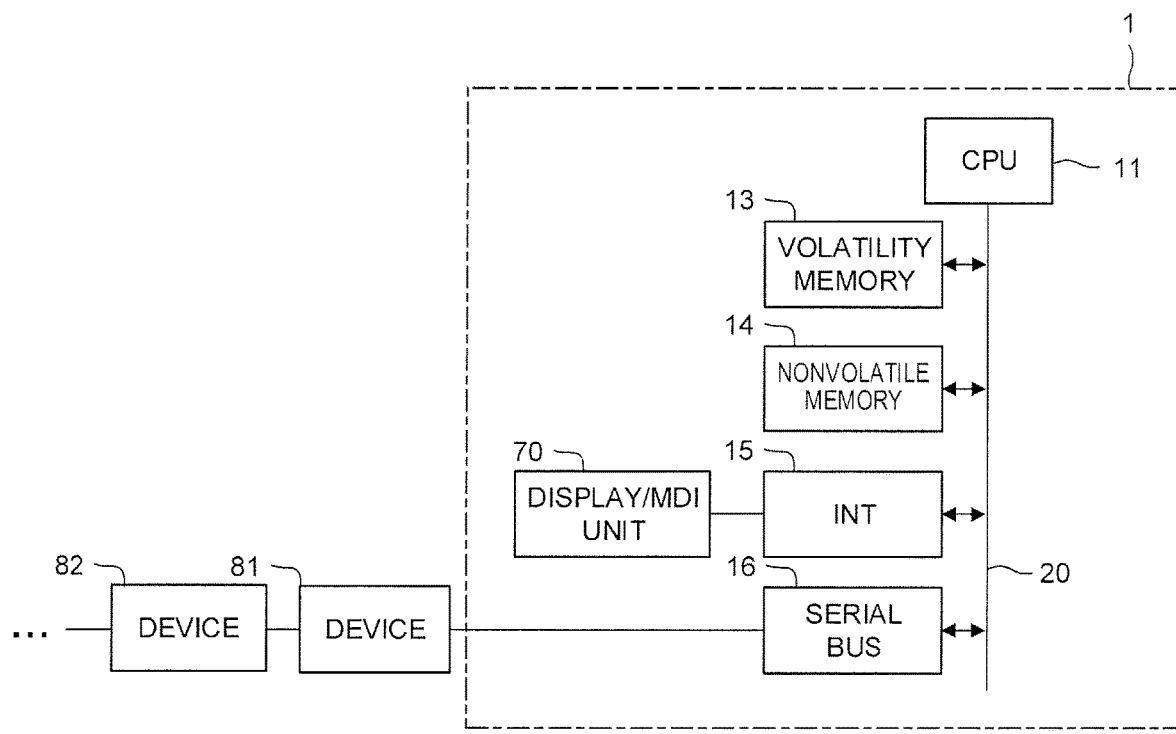
FIG. 2 is a hardware block diagram of the numerical controller according to the embodiment of the present invention.

FIG. 2 is a schematic hardware block diagram of a main section of the numerical controller 1 according to the embodiment of the present invention.

The numerical controller 1 includes a central processing unit (CPU) 11 that is a processor for totally controlling the numerical controller 1. The CPU 11 reads out a program stored in a nonvolatile memory 14 via a bus 20 to control the entire numerical controller 1 according to the program.

The nonvolatile memory 14 is configured as a memory that is kept in a storage state even when a power source of the numerical controller 1 is turned off, due to a backup of a battery (not illustrated), for example. The nonvolatile memory 14 stores a program, data, and the like, which may be loaded from a volatile memory 13 when being used. The volatile memory 13 stores temporary calculation data and display data, and data input using an input device and the like, along with the program, the data loaded from the nonvolatile memory 14.

A display/manual data input (MDI) unit 70 is a data input/output device including a display, a keyboard, and the like. A command and data input using the keyboard of the display/MDI unit 70 is transferred to the CPU 11 via an interface 15. Display data output from the CPU 11 is displayed in a display of the display/MDI unit 70 via the interface 15.

A serial bus 16 is an interface for connecting one or more devices 81, 82, . . . , using a daisy chain system. Data input from the devices 81, 82, . . . , is transferred to the CPU 11 via the serial bus 16. A command and data output from the CPU 11 are input to the devices 81, 82, . . . , via the serial bus 16.

Each of the devices 81, 82, . . . , includes a device control unit. The device control unit transmits identification information on the corresponding one of the devices in response to request by a connection information acquisition unit (described below) of the numerical controller. The identification information is information or the like indicating a kind of each of the devices and the like, for example. The identification information can be acquired by the numerical controller using only communication with each of the devices in a hardware level.

Figure 3:
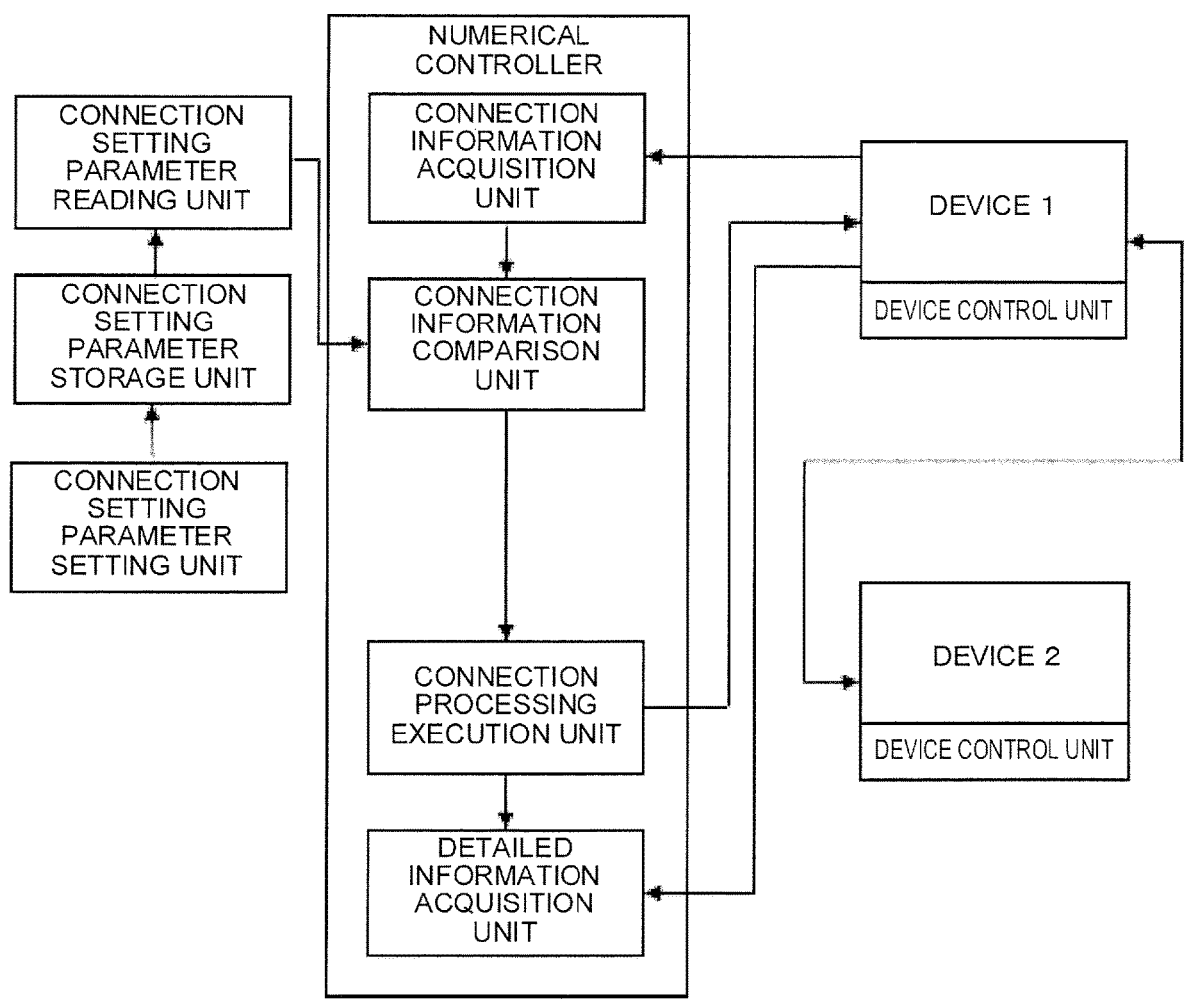
FIG. 3 is a block diagram illustrating a functional configuration of a conventional numerical controller.
Figure 4:
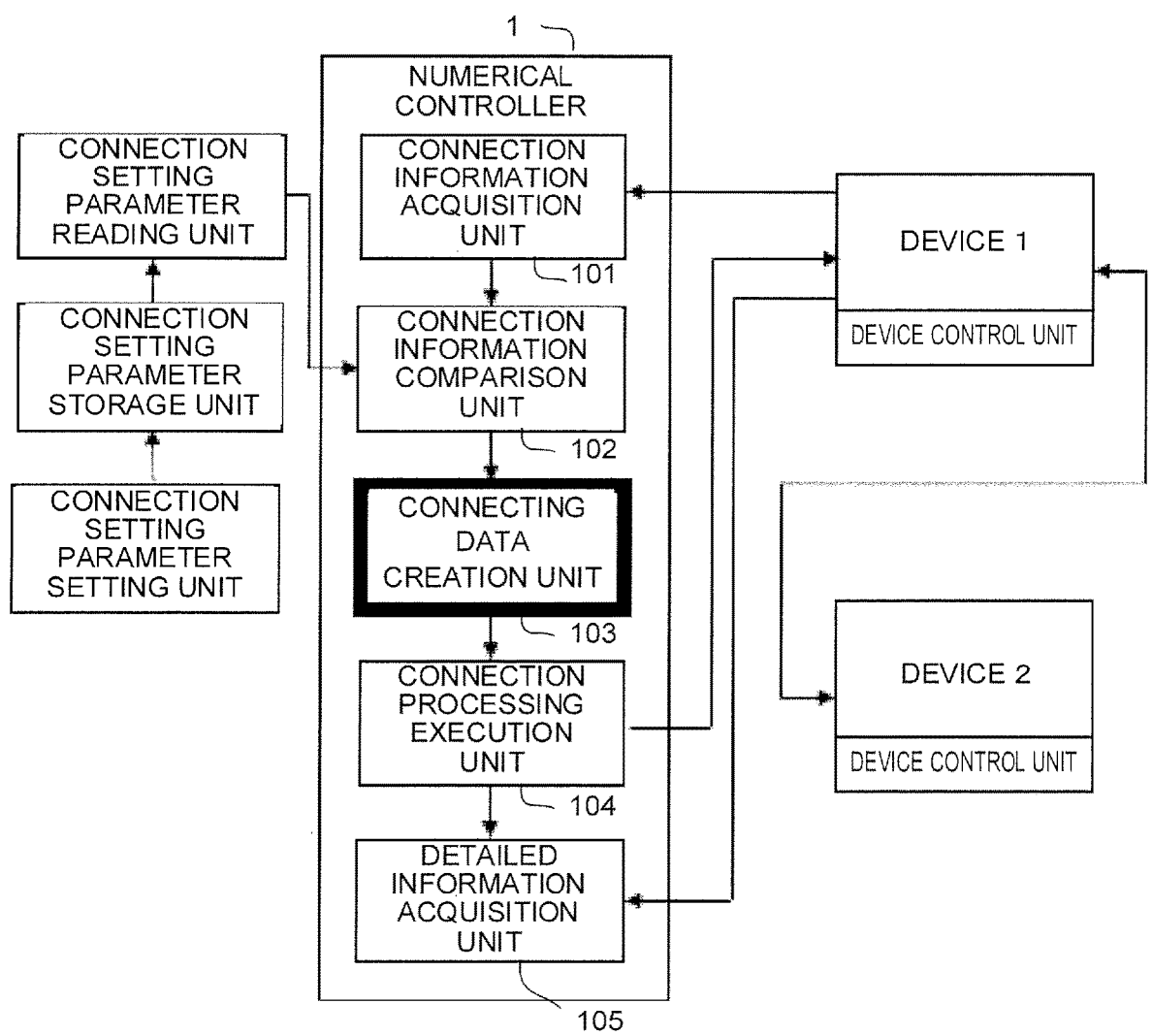
FIG. 4 is a block diagram illustrating a functional configuration of the numerical controller according to the embodiment of the present invention.

FIG. 4 is a block diagram illustrating a schematic functional configuration of the numerical controller 1 according to the embodiment of the present invention. FIG. 3 is a block diagram illustrating a schematic functional configuration of a conventional numerical controller. While both the schematic functional configurations are compared, a functional configuration of the numerical controller 1 will be described.

The conventional numerical controller includes a connection information acquisition unit that acquires connection information from each of devices (device 1, device 2, . . . ) connected to a serial bus to form a daisy chain connection, a connection information comparison unit that checks the connection information against a connection setting parameter read from the outside to check whether there is a problem, a connection processing execution unit that creates connecting data on the basis of the connection setting parameter to execute connection processing with each of the devices, and a detailed information acquisition unit that acquires detailed information from each of the devices with which the connection processing is completed.

Figures 10, 11:
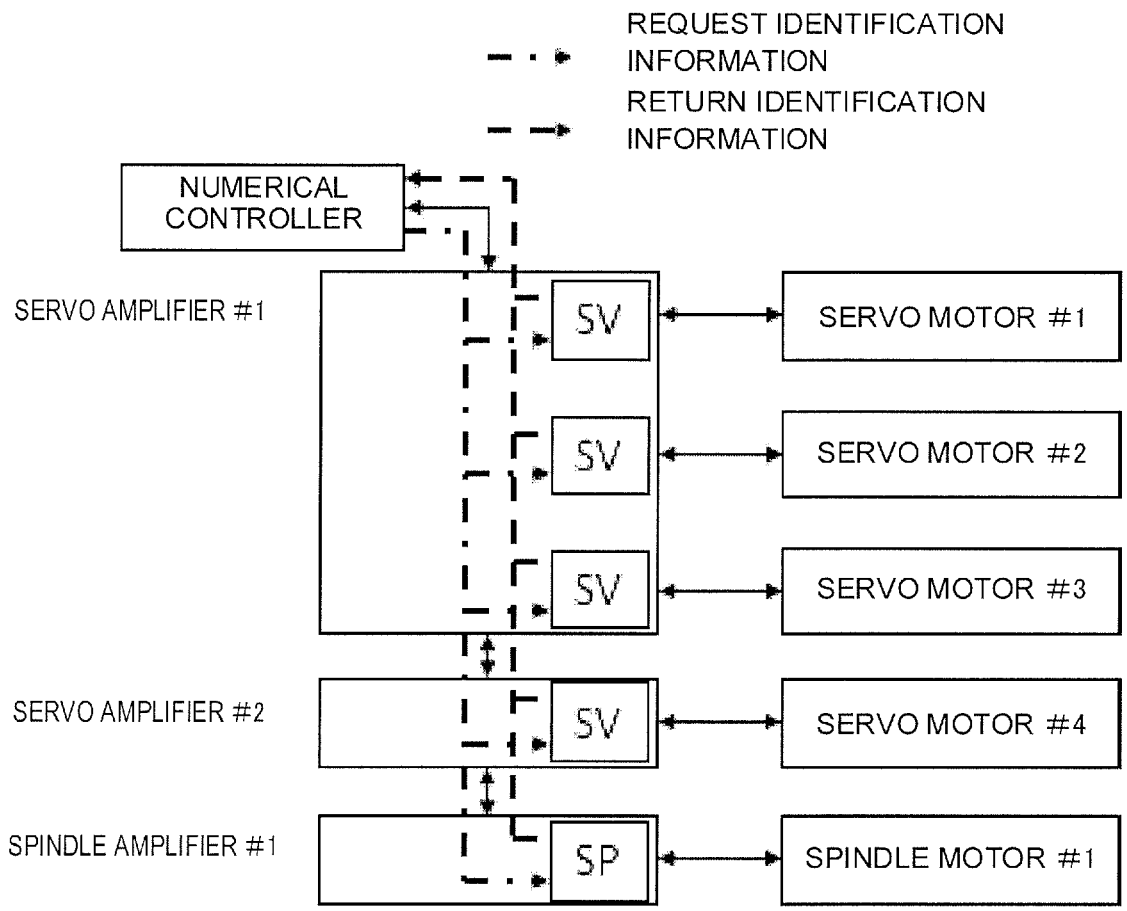
FIG. 10 illustrates acquisition processing of identification information.
FIG. 11 illustrates an example of connection information.

The connection information indicates a correspondence between a connection order indicating an order of each of the devices in the daisy chain and identification information. In the present embodiment, the connection order is numbered in ascending order from a position closer to the numerical controller, as 1, 2, . . . . FIG. 11 illustrates an example of the connection information. In this example, the connection order and information indicating a kind of each of the devices, such as SV (servo amplifier) and SP (spindle amplifier), as identification information are associated with each other.

The connection setting parameter includes the following three information items in the present embodiment.

Amplifier number: an interface number associated with the numerical controller and a specific amplifier, i.e., an identifier enabling the numerical controller to uniquely identify an amplifier.

Motor number: an interface number associated with the numerical controller and a specific motor, i.e., an identifier enabling the numerical controller to uniquely identify a motor.

Correspondence number: an identifier for uniquely identifying a combination of a logic axis in the numerical controller, and an amplifier number and a motor number.

Figure 9:
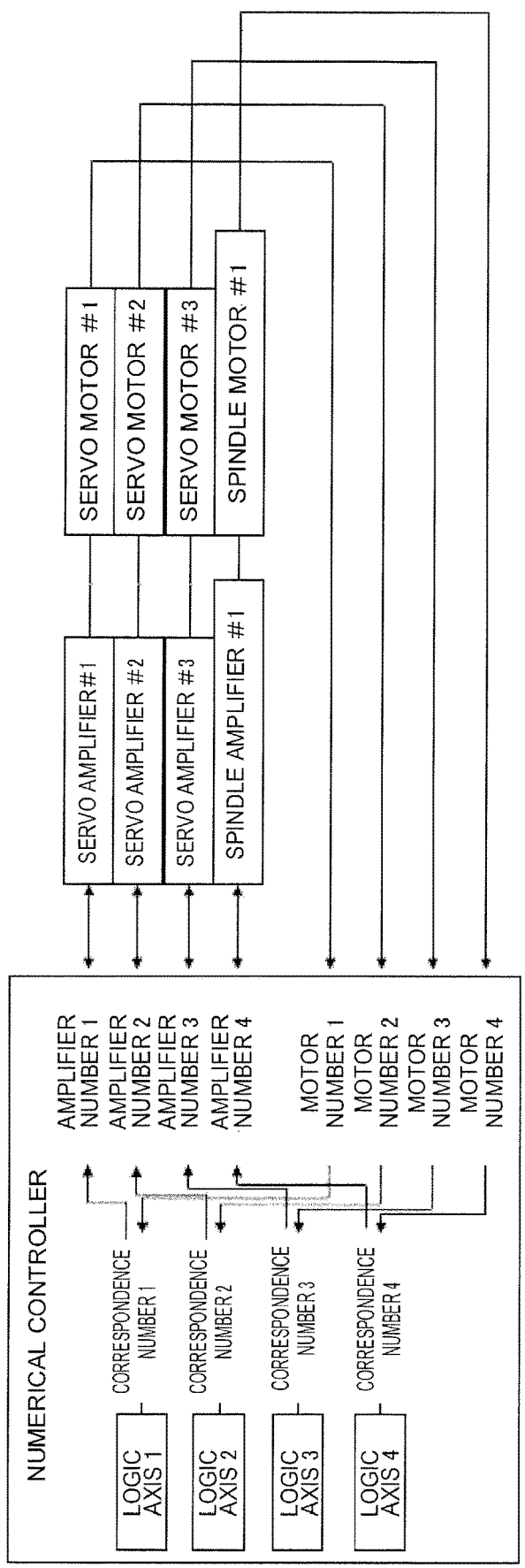
FIG. 9 illustrates a numerical controller according to the embodiment of the present invention connected to a plurality of devices.

As illustrated in FIG. 9, a plurality of logic axes (logic axis 1, 2, 3, . . . ) of the numerical controller is each used to control a specific amplifier and motor. The connection setting parameter is data for associating the logic axes with the corresponding amplifiers and motors.

Figures 12, 13:
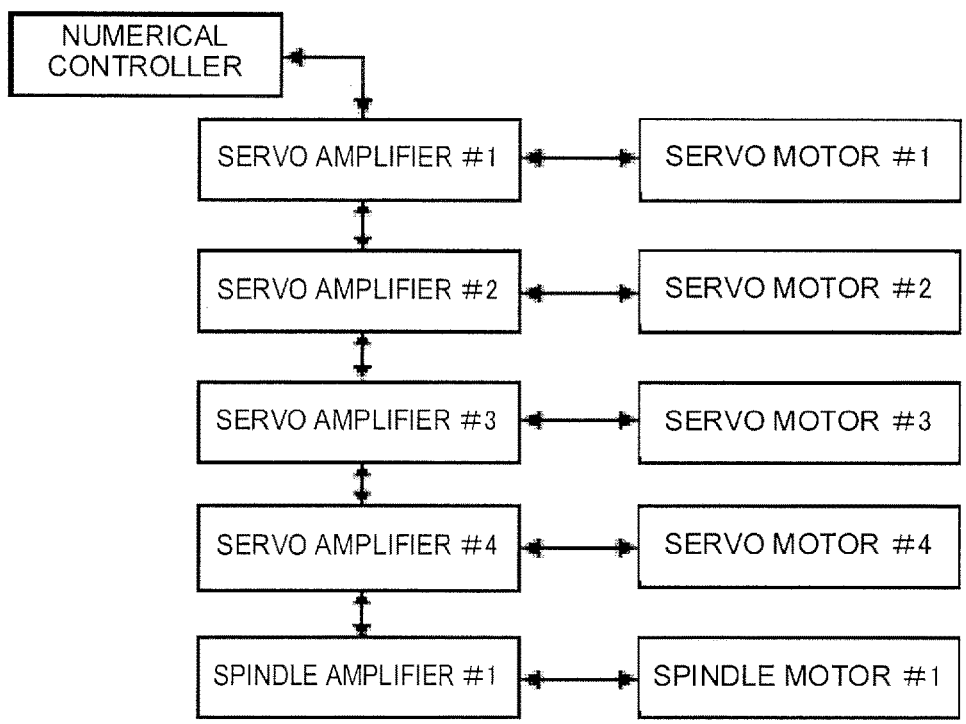
FIG. 12 illustrates a connection state of each of the devices recognized by the numerical controller according to the embodiment of the present invention using communication in a hardware level.
FIG. 13 illustrates an example of a combination table.

The connecting data is necessary to allow the numerical controller to complete connection to various amplifiers, a motor, and the like. The connecting data is setting data created using a combination table created on the basis of the connection setting parameter to execute connection processing with each of the devices. FIG. 13 illustrates an example of the combination table. In this combination table, an amplifier number, a motor number, and a correspondence number are associated with each other.

A procedure for reading a connection setting parameter to the numerical controller will be described. Typically, a connection setting parameter setting unit comprises a personal computer (PC), an MDI unit, or the like, and receives a connection setting parameter input by a technician. A connection setting parameter storage unit is a storage area for storing the connection setting parameter received from the connection setting parameter setting unit, and is typically provided in a nonvolatile memory in the numerical controller. A connection setting parameter reading unit is a processing unit that reads a connection setting parameter from the connection setting parameter storage unit so as to enable the connection information comparison unit to use the connection setting parameter. The connection setting parameter reading unit typically reads a connection setting parameter from the connection setting parameter storage unit to a volatile memory in the numerical controller.

Meanwhile, the numerical controller 1 according to the present embodiment includes a connection information acquisition unit 101, a connection information comparison unit 102, a connecting data creation unit 103, a connection processing execution unit 104, and a detailed information acquisition unit 105 that acquires detailed information from each of the devices.

The connection information acquisition unit 101 acquires connection information from each of the devices connected to the numerical controller 1 hardware-wise. Acquisition of the connection information is a publicly known art, so that detailed description thereof is eliminated here.

The connection information comparison unit 102 checks the connection information against a connection setting parameter read by the connection setting parameter reading unit to check whether there is a problem, as with the conventional numerical controller.

The connecting data creation unit 103 creates connecting data on the basis of the connection information acquired by the connection information acquisition unit 101. While the conventional numerical controller uses a connection setting parameter to create connecting data, the numerical controller 1 according to the present embodiment has a feature of using the connection information when a connection setting parameter is unusable.

The connection processing execution unit 104 executes connection processing with each of the devices by using the connecting data created by the connecting data creation unit 103. The connection processing is a publicly known art, so that detailed description thereof is eliminated here.

The detailed information acquisition unit 105 acquires detailed information from each of the devices connected by the connection processing execution unit 104. Acquisition of detailed information after connection is completed is a publicly known art, so that detailed description thereof is eliminated here.

Figure 5:
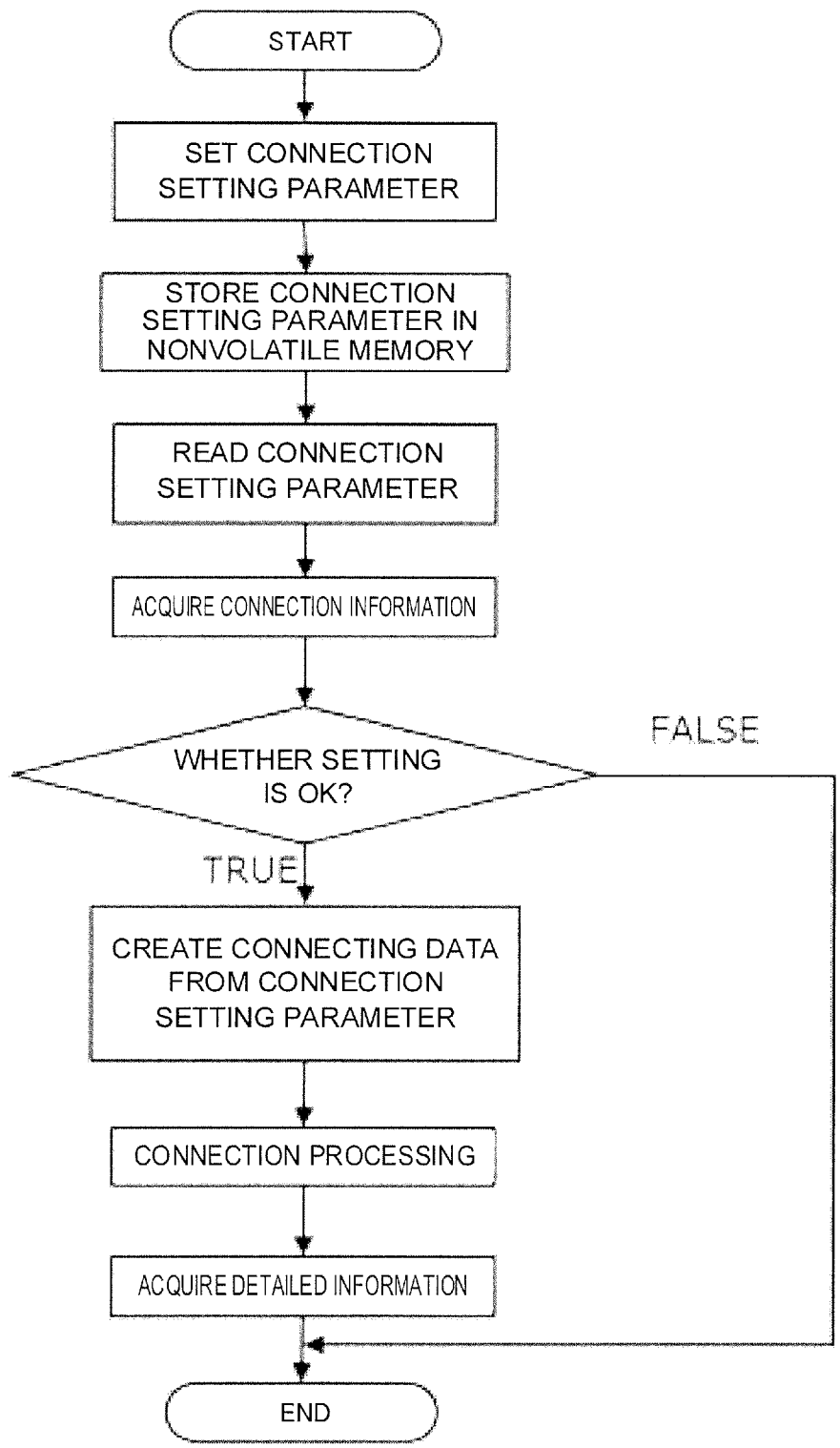
FIG. 5 is a flowchart illustrating a procedure for acquiring detailed information in the conventional numerical controller.

With reference to a flowchart of FIG. 5, a procedure for acquiring detailed information from each of the devices in the conventional numerical controller will be described. A connection setting parameter created by the connection setting parameter setting unit and stored in the connection setting parameter storage unit is read to the numerical controller by the connection setting parameter reading unit. Next, the numerical controller executes the connection processing. That is, the connection information acquisition unit acquires connection information from each of the devices connected to the serial bus to form the daisy chain connection. The connection information comparison unit checks the connection information acquired against the connection setting parameter to check whether there is a problem. When it is here determined that there is a problem, the numerical controller finishes the connection processing. When the connection information comparison unit determines that there is no problem, the connection processing execution unit creates connecting data on the basis of the connection setting parameter to execute the connection processing with each of the devices. Finally, the detailed information acquisition unit acquires detailed information from each of the devices.

Figures 7, 8:
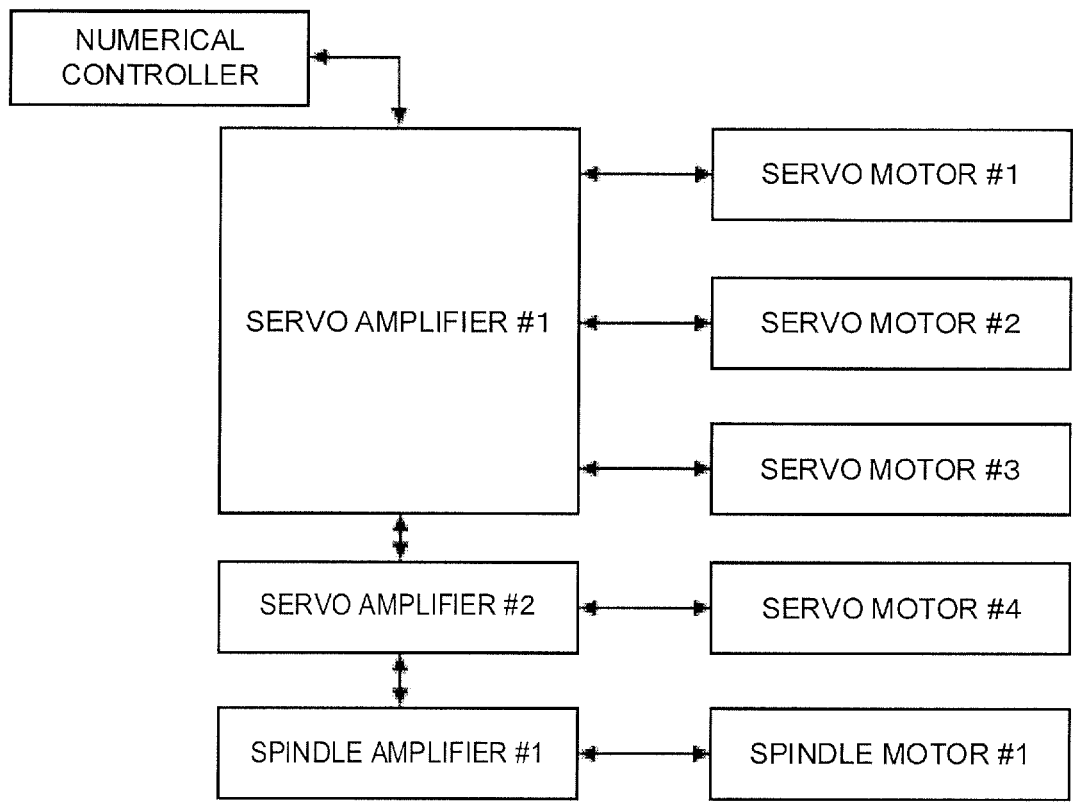
FIG. 7 is a block diagram illustrating a connection state of each of the devices to the numerical controller according to the embodiment of the present invention when a machine tool is started.
FIG. 8 illustrates an example of the detailed information.

Meanwhile, a procedure for acquiring detailed information from each of the devices in the numerical controller 1 according to the present embodiment is as follows. With reference to an example illustrated in FIGS. 7 and 8, operation of the numerical controller 1 will be described. FIG. 7 illustrates a connection state of each of the devices to the numerical controller 1 when a machine tool is started. The numerical controller 1 is connected to a servo amplifier #1, a servo amplifier #2, and a spindle amplifier #1 in this order to form a daisy chain connection. Then, the servo amplifier #1 is connected to servo motors #1 to #3, the servo amplifier #2 is connected to a servo motor #4, and the spindle amplifier #1 is connected to a spindle motor #1. FIG. 8 illustrates detailed information on each of the servo amplifier #1, the servo amplifier #2, and the spindle amplifier #1.

Figure 6:
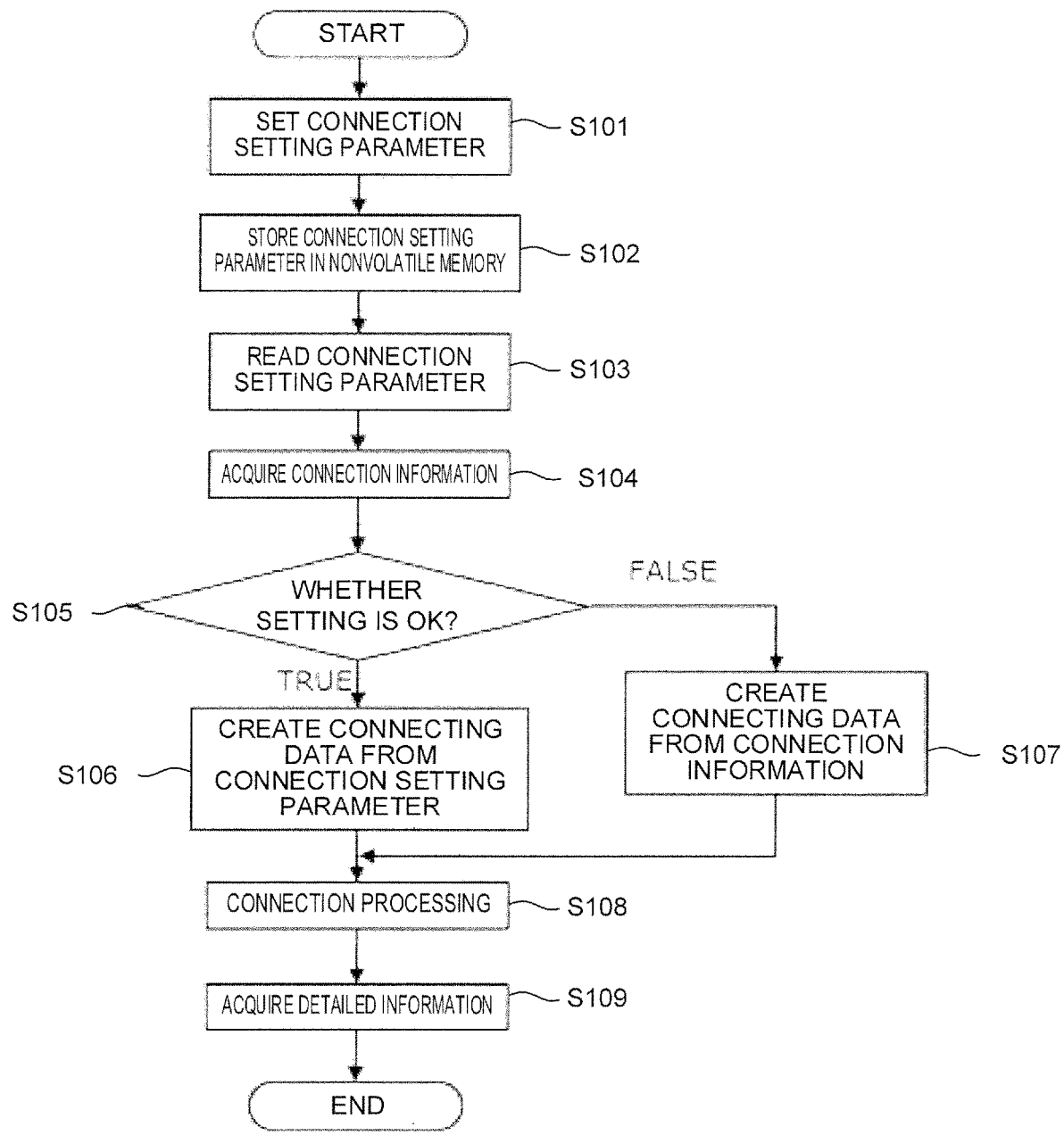
FIG. 6 is a flowchart illustrating a procedure for acquiring detailed information in the numerical controller according to the embodiment of the present invention.

With reference to a flowchart of FIG. 6, a procedure for acquiring detailed information from each of the devices in the numerical controller 1 will be described.

S101: Setting a connection setting parameter.

A technician inputs a connection setting parameter in the connection setting parameter setting unit.

S102: Storing a connection setting parameter in the connection setting parameter storage unit.

The connection setting parameter input in S101 is stored in the connection setting parameter storage unit. Once the connection setting parameter is stored in the connection setting parameter storage unit, the connection setting parameter is hold even when a power source of the numerical controller 1 is interrupted.

S103: Reading a connection setting parameter

The connection setting parameter reading unit reads the connection setting parameter stored in the connection setting parameter storage unit to the volatile memory 13. When a machine tool is started, the connection setting parameter storage unit does not store a connection setting parameter, and thus no connection setting parameter is read.

S104: Acquiring connection information

As illustrated in FIG. 10, the connection information acquisition unit 101 requests each of the amplifiers (the servo amplifier #1, the servo amplifier #2, and the spindle amplifier #1) connected to the numerical controller 1 hardware-wise to transmit identification information. In response to the request, each of the amplifiers transmits the identification information to the connection information acquisition unit 101. The connection information acquisition unit 101 receives the identification information from each of the amplifiers. This allows the connection information acquisition unit 101 to acquire information on a connection order of the devices to the serial bus. That is, the identification information is received according to the connection order from the numerical controller 1. Alternatively, a device control unit of each of the devices also can transmit information acquired by combining the connection order and the identification information. The connection information acquisition unit 101 associates the identification information received with the order received to create connection information.

FIG. 11 illustrates the connection information created by the connection information acquisition unit 101. In this example, data such as "SV" and "SP", indicating a kind of each of the devices, is only acquired as the identification information. In this case, the numerical controller 1 recognizes, using communication in a hardware level, that four SVs (servo amplifiers) are connected at respective connection orders 1 to 4, as illustrated in FIG. 12. However, two servo amplifiers composed of a triaxial servo amplifier (servo amplifier #1) and an uniaxial servo amplifier (servo amplifier #2) are actually connected to the numerical controller 1 as illustrated in FIG. 7. As described above, only the connection information allows the numerical controller 1 to only recognize a multi-axis amplifier as a plurality of uniaxial amplifiers. That is, only the connection information may cause a configuration of a machine tool that can be recognized by the numerical controller 1 to be different from an actual configuration.

S105: Checking connection information against a connection setting parameter

The connection information comparison unit 102 compares the connection information with the connection setting parameter to check whether there is a problem in setting. When there is no problem, i.e., when the connection information conforms to the connection setting parameter, processing proceeds to TRUE processing (S106). In contrast, when there is a problem, i.e., when the connection information does not conform to the connection setting parameter, the processing proceeds to FALSE processing (S107). In this example of the present embodiment, no connection setting parameter is acquired in S103, so that the processing proceeds to the FALSE processing.

S106: Creating connecting data (conventional art)

The connecting data creation unit 103 creates a combination table using connection setting parameters and creates connecting data on the basis of the combination table, as with the conventional numerical controller.

S107: Creating connecting data

The connecting data creation unit 103 creates a combination table using connection information and creates connecting data on the basis of the combination table.

The conventional numerical controller creates a combination table using connection setting parameters. This combination table includes an amplifier number and a motor number. The amplifier number and the motor number are information that is to be basically set as a connection setting parameter. However, without reference to detailed information of each of the devices, the amplifier number and the motor number may not be easily created. In this stage, the detailed information is not yet acquired, so that a technician has no clue to set the amplifier number and the motor number.

Concerning this point, the inventors find that satisfying a predetermined condition succeeds in connection processing with each of the devices even when the amplifier number and the motor number included in the combination table are not necessarily correct. More specifically, when conditions such as including information (information indicating a kind of each of the devices), included in the connection information, in a part of the amplifier number and motor number, and describing the amplifier number and the motor number in a predetermined form, are satisfied, connection processing with each of the devices can be executed even using an amplifier number and a motor number based on dummy data.

For example, the connecting data creation unit 103 creates a prefix including information indicating a kind of each of the devices, included in the connection information, and adds a serial number for each prefix. The serial number can be added according to a connection order. Even when an amplifier with multiple axes is included in an actual configuration, a number is added on the assumption that all amplifiers are each a uniaxial amplifier. The combination table is created by using an amplifier number and a motor number, created as described above.

As described above, the connecting data creation unit 103 creates a temporary amplifier number, motor number, and correspondence number, using the connection information acquired in S104, and creates a temporary combination table including the numbers. FIG. 13 illustrates an example of the temporary combination table. The table includes amplifier numbers and motor numbers that are temporary information created by the connecting data creation unit 103 on the basis of the connection information, i.e., are dummy data. Then, the connecting data creation unit 103 creates connecting data using the temporary combination table.

It is preferable that the temporary combination table created here be used only for acquiring detailed information in the present embodiment. When each of the devices actually operates, the numerical controller 1 additionally creates a connection setting parameter with reference to detailed information acquired later to execute the connection processing with each of the devices again according to a usual procedure.

S108: Connection processing

The connection processing execution unit 104 executes connection processing with each amplifier and motor using the connecting data created in S106 or S107.

S109: Acquiring detailed information

The detailed information acquisition unit 105 acquires detailed information from each amplifier and motor for which the connection processing is completed. In this state, the numerical controller 1 can finally recognize that the servo amplifier #1 is a triaxial amplifier or the like, for example.

The detailed information acquisition unit 105 may repeat communication in a software level while changing or adding communication setting as needed, thereby acquiring additional detailed information from each of the devices.

Figure 14:
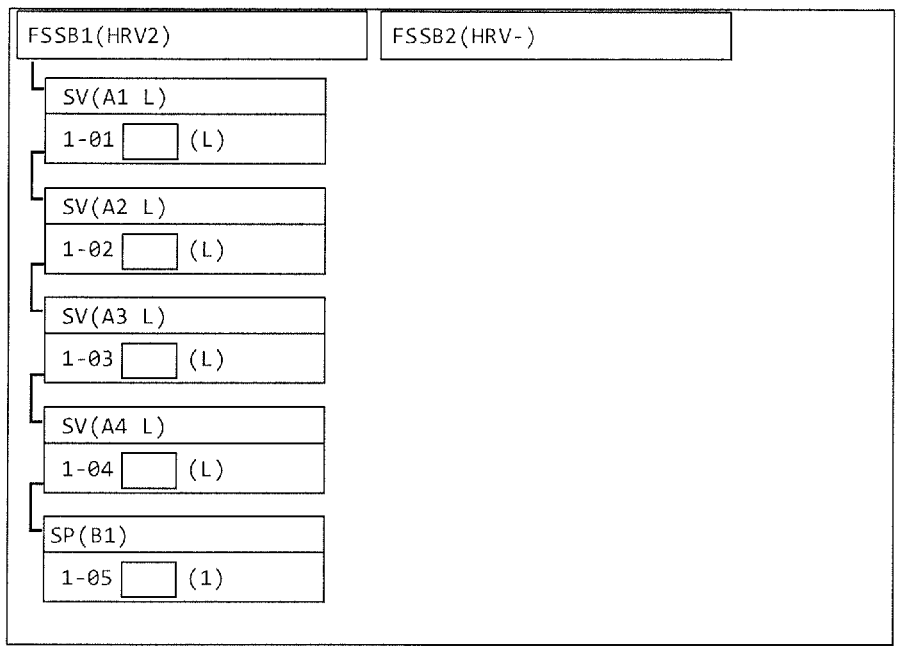
FIG. 14 illustrates an example of screen display of the conventional numerical controller.
Figure 15:
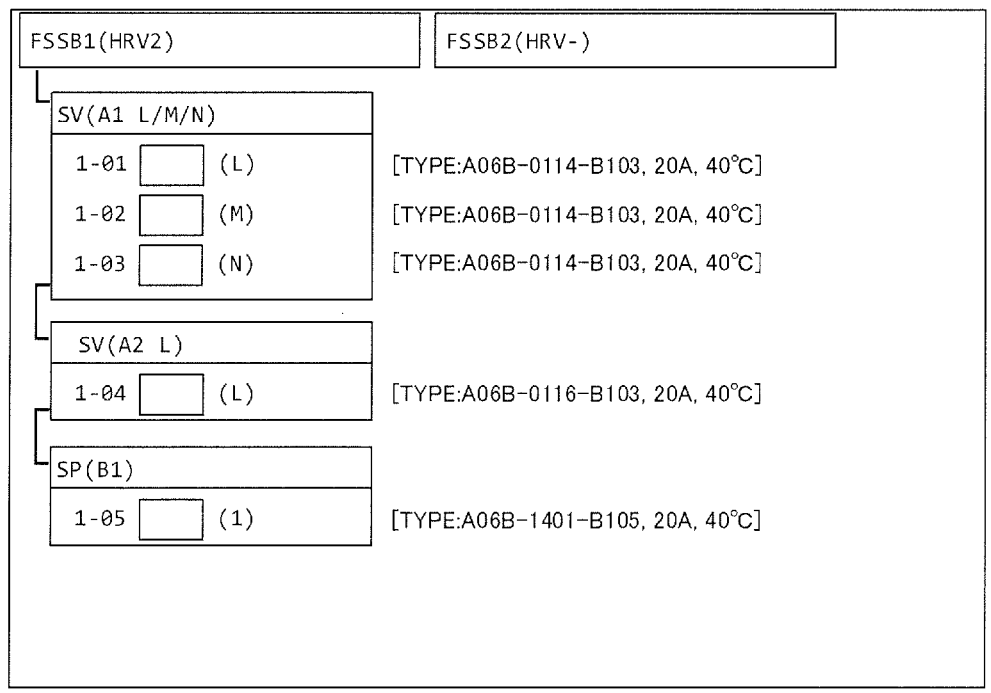
FIG. 15 illustrates an example of a function of screen display of detailed information.
Figure 16:
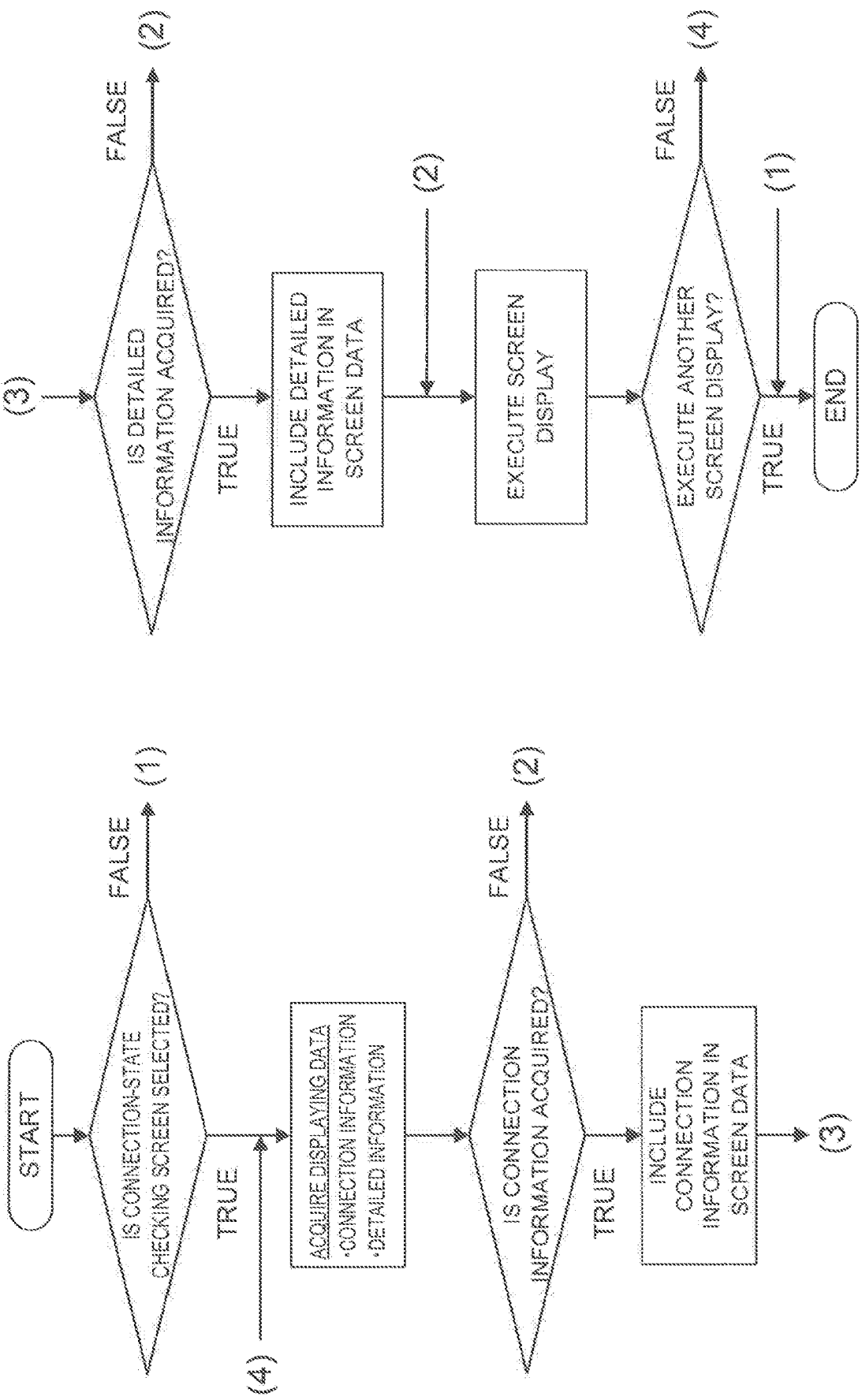
FIG. 16 is a flowchart illustrating screen display processing of detailed information.

FIG. 15 illustrates a realized example of a function of displaying detailed information acquired by the numerical controller 1 in S109 in a screen. In contrast, FIG. 14 illustrates an example of screen display of the conventional numerical controller. With reference to a flowchart of FIG. 16, processing related to the screen display of FIG. 15 will be described.

The numerical controller 1 includes a display unit (not illustrated) that acquires displaying data when a technician selects a connection-state checking screen. The displaying data includes connection information and detailed information. The connection information is acquired by the connection information acquisition unit 101 in S104. The detailed information is acquired by the detailed information acquisition unit 105 in S109.

When the connection information is acquired, the display unit displays the connection information in a screen. In each of FIG. 14 (conventional art) and FIG. 15 (the present embodiment), the connection information is displayed. When the detailed information is acquired, the display unit displays the detailed information in the screen. There is no detailed information displayed in FIG. 14 (conventional art) because there is no function of acquiring the detailed information in this stage. In contrast, the detailed information is displayed in FIG. 15 (the present embodiment).

According to the present embodiment, a technician can refer to detailed information on each of the devices when setting a connection setting parameter, so that a burden of setting and a setting error can be reduced. In addition, a detailed wiring state between the numerical controller and each of the devices can be visually seen, so that a wiring error or the like can be easily found.

The present invention is not limited to the embodiment described above, and can be practiced in various aspects by modifying the embodiment. For example, while each of the devices connected to the serial bus to form a daisy chain connection is exemplified in the embodiment described above, the present invention is not limited to this. Any connection form can be used as long as the connection information acquisition unit 101 can acquire a connection order and identification information.

In addition, while the amplifier, the motor, the separate detector, and the like are exemplified as the devices in the embodiment described above, the present invention is not limited to this. Instead of the devices, input/output devices such as an operation panel, a monitor, and a sensor may be used, for example, as long as they operate like the devices of the embodiment described above.

The invention claimed is:

1. A numerical controller connectable to a plurality of devices, the numerical controller comprising:
   a connection information acquisition unit that acquires connection information on the devices, including information indicating a connection order and a kind of each of the devices by communicating with each of the devices;
   a connecting data creation unit that creates connecting data using the connection information;
   a connection processing execution unit that executes connection processing with each of the devices using the connecting data;
   a detailed information acquisition unit that acquires detailed information from each of the devices subjected to the connection processing; and
   a connection information comparison unit that compares the connection information with a connection setting parameter,
   wherein the connecting data creation unit creates connecting data using the connection information when a comparison result acquired by the connection information comparison unit shows a problem between the connection information and the connection setting parameter.

2. The numerical controller according to claim 1, wherein the connecting data includes a number identifying an amplifier, a motor, a separate detector, or an input/output device.

3. The numerical controller according to claim 1, wherein the detailed information acquisition unit repeats communication to acquire additional information from each of the devices.

* * * * *